Oct. 31, 1961 E. E. BUCHER Re. 25,071
SNOW PLOW
Original Filed Aug. 7, 1951 3 Sheets-Sheet 1
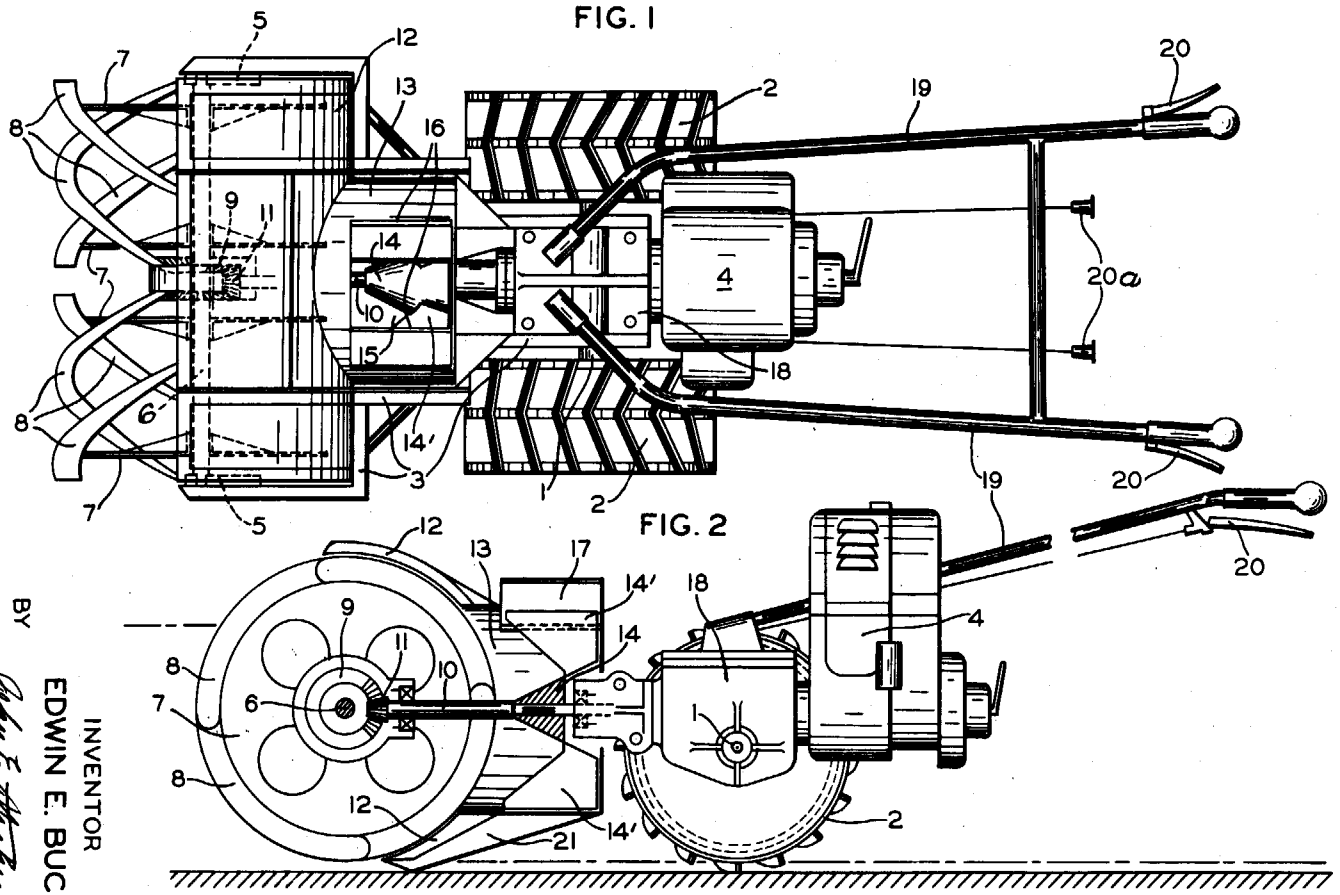
INVENTOR
EDWIN E. BUCHER
BY John E. Stupka
ATTORNEY Oct. 31, 1961 E. E. BUCHER Re. 25,071
SNOW PLOW
Original Filed Aug. 7, 1951 3 Sheets-Sheet 2
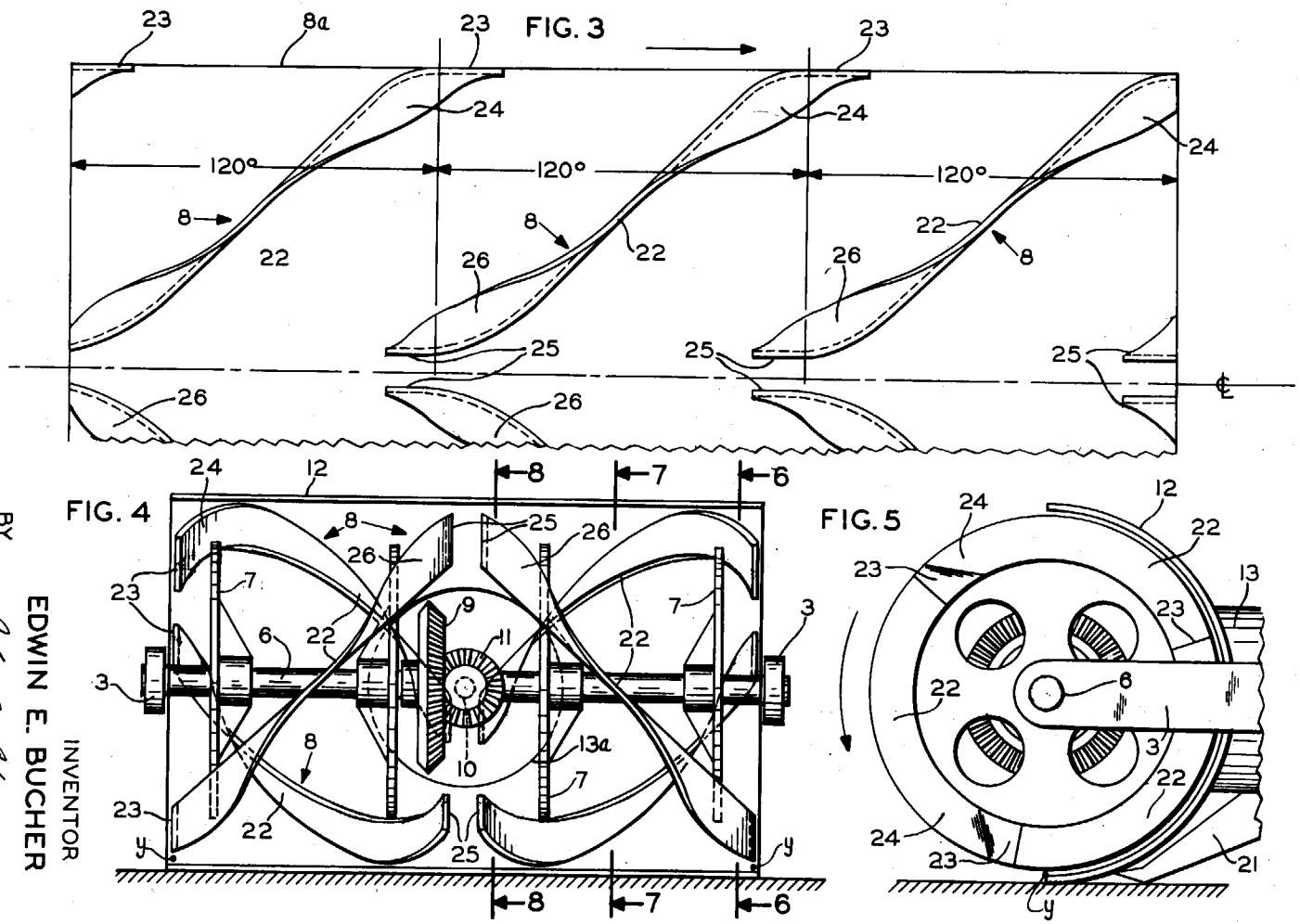
INVENTOR
EDWIN E. BUCHER
BY John E. Stryker
ATTORNEY Oct. 31, 1961 E. E. BUCHER Re. 25,071
SNOW PLOW
Original Filed Aug. 7, 1951
3 Sheets-Sheet 3
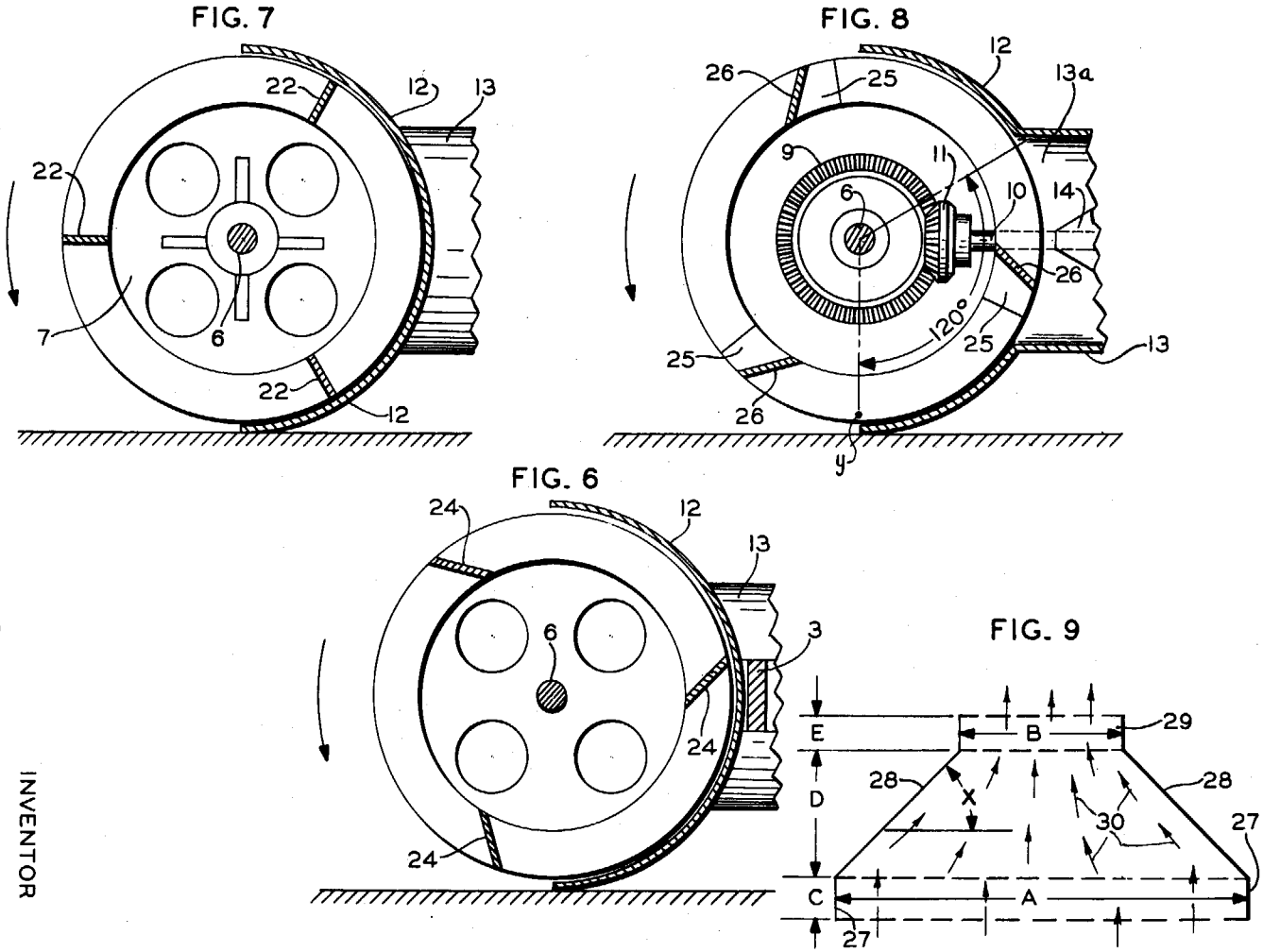
INVENTOR
EDWIN E. BUCHER
BY John E. Stryker
ATTORNEY United States Patent Office Re. 25,071
Reissued Oct. 31, 1961

25,071
SNOW PLOW

Edwin E. Bucher, Davos, Switzerland

Original No. 2,751,697, dated June 26, 1956, Ser. No. 240,684, Aug. 7, 1951. Application for reissue June 9, 1958, Ser. No. 741,211
13 Claims. (Cl. 37—43)

Matter enclosed in heavy brackets [ ] appears in the original patent but forms no part of this reissue specification; matter printed in italics indicates the additions made by reissue.

This invention relates to a rotary or revolving plow for the removal of snow or the like, and particularly to a power-driven machine of this class having a blower adapted to throw the snow to either side of the path of the machine and mechanism for cutting a path of predetermined width through the layer of snow to be removed while breaking up, gathering and conveying the snow directly and at increased velocity to the blower intake where it is released.

It is an object of the invention to provide a machine of the class described which has increased efficiency as compared with those of the prior art.

A particular object is to provide in a machine of the class described highly efficient blades in the nature of milling blades which rotate about a horizontal axis extending transversely to the direction of travel of the machine and each of which is formed and arranged to perform the important functions of cutting into, breaking up and gathering the snow layer to be removed while conveying the gathered snow along the shortest spiral path to the intake of the blower and there releasing the snow to be blown at high velocity to either side of the machine.

A further and particular object is to provide snow gathering and conveying mechanism for the front of a snow plow comprising coacting groups of blades mounted for rotation about a horizontal axis extending transversely to the direction of travel of the machine, the outer edges of the several blades defining a cylinder having a diameter greater than half the length of the cylinder and each blade extending circumferentially of the cylinder not more than 180 degrees and having a major central helical portion the pitch of which is approximately 45 degrees to a plane perpendicular to the axis of the cylinder.

Another object is to improve the efficiency of such blades by forming the outer, leading end portion of each blade with a forward inclination and the opposite or trailing end portion of each blade with a rearward inclination relative to the direction of rotation.

The invention also includes certain other novel features of construction which will be more fully pointed out in the following specification and claims.

Referring to the accompanying drawings:

FIGURE 1 is a schematic plan view illustrating one embodiment of the invention;

FIG. 2 is a schematic part side elevational and part longitudinal sectional view of the machine;

FIG. 3 is a plan view showing a group of my improved blades projected on a development of the cylindrical surface defined by the outer edges of the several blades and illustrating a modification of the invention wherein the trailing end portions of the several blades are inclined rearwardly with respect to the direction of rotation;

FIG. 4 is a front elevational view showing a preferred form of the blades and their supporting and operating mechanism, together with the casing in which the blades operate;

FIG. 5 is an end view of the structure shown in FIG. 4;

FIGS. 6, 7 and 8 are cross sectional views taken on the lines 6—6, 7—7 and 8—8 respectively of FIG. 4, and FIG. 9 is a diagram illustrative of the principles of operation of the present invention.

As shown in FIGS. 1 and 2 of the drawing, my new machine has a chassis including frame members 3 supported on a shaft 1 and calked wheels 2. Mounted on the chassis to the rear of the shaft 1 is an engine 4 and in front of the shaft 1 the snow removing mechanism is supported. This mechanism embodies my invention and performs the functions hereinbefore described, including those of chipping the snow from the compact layer in the path of the machine, cutting up and gathering in the snow while conveying it rapidly and efficiently to the centrally located blower which ejects it to the side. The snow removing mechanism consists of two similar units mounted on a common shaft 6 which rotates in bearings 5 of the chassis, each unit having two blade carrying members 7 and a plurality of blades 8 secured to the outer peripheries of the members 7 in a generally helical arrangement. The blades 8 of one unit have a pitch which is opposite to that of the blades of the other unit or half of the mechanism so that all blades move the snow from the outside toward the center. More specifically, each blade conveys snow from a lateral extremity of the snow cut, in a helical path to the intake of the blower, while the shaft 6 is rotated approximately one-half of a complete revolution.

A bevel gear 9 is fixed on the shaft 6 near the middle thereof and meshes with a bevel gear 11 fixed on a drive shaft 10. The latter shaft is connected through suitable transmission gearing and controls to the engine 4. A casing 12 of substantially semi-cylindrical shape forms a mold board with which the blades 8 coact in conveying the snow to the blower presently to be described.

A cylindrical casing 13 is connected to and communicates with the rear central part of the casing 12 and contains a centrifugal wheel 14 which is keyed to the driving shaft 10 and provided with blades 14' flaring outwardly. At its top the casing 13 is provided with an ejecting spout 15 which may be adjusted to discharge the snow toward the right or left of the path of the machine. Transmission gearing is contained in a housing 18 terminating in the engine casing. Handle bars 19 are secured to the housing 18 and project rearwardly of the engine, being provided with suitable control levers 20 operatively connected to the transmission gearing. Further controls for the mechanism are indicated at 20a (FIG. 1). By means of skids 21 secured to the lower side of the casing 12, this casing may be slidably supported on the surface of the ground to be cleared of snow.

The machine is propelled by the engine driven calked wheels 2 and the material to be removed is chipped from the solidified mass by the helically arranged blades 8 coacting with the casing 12 to convey the material toward the rear and into the central intake opening of the blower casing 13 where the material is drawn in at high velocity by the centrifugal wheel 14, the blades 14' of which discharge through the spout 15. This spout may be elongated to act as a diffuser and to load the snow on vehicles for carting it away.

Each of the blades 8 is arranged with its leading or outer end portion directed or inclined to the front relative to the direction of rotation and has its trailing end portion toward the center of the machine, rearwardly directed or inclined, as more fully hereinafter described. As further indicated in FIG. 1 of the drawings, each of the blades 8 extends circumferentially of the cylinder defined by their outer edges less than 180 degrees and has a pitch less than half the length of such cylinder.

An important feature of my construction which greatly improves the action and efficiency of the blades resides in my arrangement whereby the trailing end portions of the blades carried by one-half the rotor are spaced laterally relative to those carried by the other half of the rotor and at opposite sides of the vertical plane through the axis of the blower intake, leaving a clear central passage for the snow where the highest velocity is required.

The efficiency of these blades is also improved by reason of the forward inclination of their leading end portions and rearward inclination of their trailing end portions relative to the direction of rotation. They thus positively gather the snow into the bottom of the casing 12 at both sides of the cut and accelerate the gathered snow while carrying it along the shortest spiral path to the unobstructed passage between the spaced trailing ends of the blades at the center of the intake of the blower into which the snow passes under centrifugal force assisted by the backward inclination of the end portions of the blades 8 directly in front of the blower intake. This construction results in a minimum of loss of power as compared with ordinary plows which are so constructed as to cause much pushing of the snow ahead of the plows and much recirculating, churning or other reworking of the snow before it passes into the intakes of the blowers.

In FIGS. 3–8 inclusive details of a preferred form of the invention are illustrated. As best shown in FIG. 3, each of the blades 8 extends circumferentially of the development 8a of the cylinder defined by the outer edges of these blades somewhat less than 180 degrees and has a helically disposed main portion 22, the pitch of which is approximately equal to 45 degrees. The leading, outer end of each blade 8 has a circumferentially extending portion 23, of reduced pitch or substantially without pitch, and an adjacent portion 24 which is forwardly inclined in the direction of rotation (see also FIG. 6). A trailing end portion 25 of each blade also extends circumferentially with a smaller pitch or substantially without pitch, and an adjacent portion 26 is inclined rearwardly relative to the direction of rotation, as further indicated in FIG. 8. Midway between its ends, each blade portion 22 has faces which are disposed radially of the cylinder, as shown in the cross sectional view, FIG. 7.

The portions 25 of the blades carried by one-half of the shaft 6 are spaced longitudinally of the cylinder relative to the corresponding portions of the blades carried by the other half of the shaft. This spacing of the blades is of prime importance because it allows the snow to flow as a stream at a velocity higher than that of the blades directly to the center of the blower intake. It has been determined that if the blades extend entirely across and directly in front of the blower intake, the snow must move at the same velocity as the blades and is compacted at the critical point where the greatest acceleration is required for efficiency. With my improved laterally spaced blades and with the pitch described, the stream of snow is accelerated by the blades which slide on both sides of the stream entering the blower intake. This will be evident by reference to FIG. 9 wherein the passage B to the blower must be unobstructed in the interest of efficiency and the avoidance of compaction of the snow in this passage. Incidentally, the lateral spacing of the blades causes their trailing ends to clear the central driving shaft 10.

By the blade construction and arrangement described, the leading end portions 23 are caused to cut into the mass of snow to be removed and to form the side walls of the cut while the adjacent end portions 24 gather in the loosened and disintegrated material which has the greatest distance to travel to the blower intake and least time in which to reach the blower. The snow thus gathered from the sides of the cut as well as that gathered by other portions of the blades is conveyed along the spiral path defined by the portions 22 of the blades and then released and discharged at increased velocity toward the rear and directly in front of the blower intake 13. The backwardly inclined portions 26 and end portions 25, of reduced or substantially no pitch, push the snow to the rear into the blower intake and insure quick release of the snow while minimizing the constriction which would otherwise be caused by the rotation of the blades across and closely adjacent to the blower intake.

In further explanation of the principles involved in the construction of my improved snow plow, reference is made to the diagram FIG. 9. In this diagram it is assumed that snow is to be removed from a path of predetermined width represented by the dimension A and is to be conveyed to a smaller passage of width B by forcibly advancing opposed pairs of walls 27, 28 and 29 in the appropriate direction to cause the snow to flow between the walls, as indicated by the arrows 30. The angle X between each of the walls 28 and the front of the plow must be of such magnitude as to cause the snow to slide along these walls rather than to cause it to be pushed ahead of them. It has been determined that the coefficient of friction between snow and the surface of iron or steel members is such that if the angle X is substantially less than 45 degrees the snow will not slide along the walls 28 or along other members such as the blades 8 which confront the snow at an angle to propel it laterally relative to the direction of travel of the plow. This angle may be greater than 45 degrees, but in such case the lateral movement of the snow is proportionately reduced and the efficiency of the plow is lowered. Consequently the optimum angle for the portions of the blades 8, which are depended on to impart movement of the snow toward the central opening of the blower is approximately 45 degrees. Expressed in terms of the complement of angle X, the pitch of the major portion of the blades 8 relative to planes perpendicular to the axis of the shaft 6 must not be greater than 45 degrees.

As further indicated in FIG. 9, it is desirable in order to gather the snow into the plow mechanism and deliver it through a narrower passage of width B to provide a cutting zone C defined by the spaced parallel walls 27 as well as a conveying and accelerating zone D, defined by the angularly disposed walls 28 and a snow release and discharge zone E, defined by the parallel walls 29. Similar zones are created respectively by the leading end portions 23, central portions 22 and trailing end portions 25 of the several blades 8. The lateral spacing of these trailing end portions corresponds to the lateral spacing of the walls 29 (FIG. 9) in affording an unobstructed passage for snow flowing at a high velocity to the center of the blower intake opening.

In the construction of my improved plow, I have utilized the theory and principles described in determining the optimum pitch angle of the blades 8 in relation to the outside diameter of the blade structure and width of the path to be cut in the snow layer. In determining the optimum length and pitch of the blades 8 and the optimum diameter and length of the cylinder defined by their outer edges, I have also taken into account the fact that in the operation of machines of the character described particles or masses of snow located at the extreme outer, lower corners of the casing 12, indicated by the points Y in FIGS. 4, 5 and 8, are most difficult to convey directly, i.e., without recirculating, to the blower intake opening 13a because of the time element involved and fact that snow at such points has less time to reach the blower intake than particles or masses of snow located elsewhere in the path of the plow. As indicated in FIG. 8, a particle of snow at the point Y should be carried through an angle of approximately 120 degrees circumferentially of the cylinder in order to reach the top of the intake opening 13a, without passing this opening. If the particle at point Y is carried by a blade having a pitch of approximately 45 degrees, circumferentially through an angle substantially greater than 120 degrees it will be carried past the opening 13a and power will be wasted in carrying it around the cylinder again before it can be delivered to the blower. It is thus apparent that with blades pitched at the optimum angle of approximately 45 degrees, the angularly pitched portions of the blades should extend approximately 120 degrees circumferentially of the cylinder.

From the factual considerations described, I have determined that greatly improved efficiency is obtained by making the diameter of the cutter cylinder, defined by the outer edges of the blades, substantially greater than half the length of such cylinder; by constructing each blade so that it extends circumferentially of the cylinder not substantially more than 180 degrees, and by providing a helical portion extending circumferentially 120 degrees and with pitch of approximately 45 degrees. As further hereinbefore pointed out, the forwardly inclined, leading end portions and rearwardly inclined, trailing end portions of the blades also improve the efficiency of the operation which is further improved by reason of the reduced pitch of the leading and trailing ends of the blades. The high efficiency resulting from my improvements has been demonstrated.

The number and width of the blades carried by each half of the horizontally extending shaft 6 may be varied, depending on the size and power of the plow and other factors, such as price requirements of the smaller plows. The mechanical construction is facilitated and the cost reduced if from two to five blades are provided on each half of the mechanism and if the width of each blade, radially of the cylinder, is made less than one-half the radius thereof. In order to coact with a casing 12, having a cylindrical inner surface, it will be evident that the outer edges of the blades 8 must define a cylinder in close proximity to the surface of the casing, but it is not necessary that the inner edges of these blades shall define a cylinder.

Instead of supporting the blades 8 on wheel-like supports 7, it is preferable to provide thin and relatively wide spoke-like supports directly welded or otherwise secured at their outer ends to the individual arcuate blades and at their inner ends to a hub on the shaft 10. The outer end portion of each such spoke-like support is preferably shaped to conform to the pitch of the blade along the zone of connection with the support. Thus three spoke-like supports may be substituted for each of the supports 7, each rigidly joined to one of the blades 8, to thereby assist the action of the blades 8 in conveying the snow at the highest rate of speed to the blower intake. In the larger size plows, the width of the individual spokes may be enlarged at their outer ends where they are joined to the blades 8 and when made wide enough the spokes may be caused to merge and form complete shovel-like structures extending to the rotor shaft and adapted to carry the snow through the shortest spiral path from the outside, leading ends of the blades to the blower intake opening.

It will be understood that the snow removing mechanism herein described may be mounted in front of a tractor or other motor vehicle and driven thereby where large capacity mechanism is required. It is also contemplated to arrange two or more sets of the blades 8, together with their supporting and operating mechanism, one above the other or at opposite sides of the plow.

The present application is a continuation in part of my application Serial No. 86,020, filed April 7,1949, for Snow Plow, and now abandoned.

Having described my invention, what I claim as new and desire to protect by Letters Patent is:

1. In a snow plow having a power-driven blower, a casing having a cylindrical inner surface extending transversely to the path of the plow and being formed with a centrally located opening communicating with the intake opening of the blower, the improvements which comprise, a transversely divided rotor extending transversely to the direction of travel of the plow and having a plurality of blades carried by each half of the rotor, the outer edges of said blades defining a cylinder disposed in close proximity to said cylindrical surface of the casing, the several blades carried by the respective halves of said shaft having angularly pitched portions formed and arranged to impel snow outwardly and longitudinally from the trailing end portions of said blades into said centrally located intake opening of the blower along a spiral path not exceeding 180 degrees circumferentially of the rotor, portions of the several blades adjacent to the leading ends being forwardly inclined in the direction of rotation of the rotor, the length of the cylinder defined by said blades being less than twice the diameter of said cylinder and power-driven [measn] *means* for rotating said rotor.

2. In a snow plow having a power-driven blower, a casing having a substantially cylindrical inner surface extending transversely of the path of the plow and being formed with a centrally located opening communicating with the intake opening of the bloder, the improvements which comprise, a transversely divided rotor extending transversely to the direction of travel of the plow and having a plurality of blades carried by each half of the rotor, the outer edges of said blades defining a cylinder disposed in close proximity to said cylindrical surface of the casing, the several blades carried by the respective halves of the rotor having angularly pitched portions intermediate their ends extending at an angle of approximately 45 degrees to the axis of rotation of the rotor, and trailing end portions disposed to impel snow outward and longitudinally from said trailing end portions into said centrally located intake opening of the blower, the blades carried by one half of said rotor being spaced longitudinally thereof relative to the blades carried by the other half thereof, the space between the trailing end portions of said blades being unobstructed for the flow of snow longitudinally and outward from the blades into said intake opening of the blower, the pitched portion of each of said blades extending circumferentially of said cylinder through an angle not exceeding 180 degrees, the length of the cylinder defined by said blades being less than twice the diameter of said cylinder, and power-driven means for rotating said rotor.

3. A snow plow in accordance with claim 2 wherein a portion of each of said blades adjacent to the leading end is forwardly inclined in the direction of rotation of said rotor.

4. A snow plow in accordance with claim 2 wherein a portion of each of said blades adjacent to the trailing end is rearwardly inclined relative to the direction of rotation of the rotor.

5. A snow plow in accordance with claim 2 wherein a portion of each of said blades adjacent to its leading end is forwardly inclined in the direction of rotation of said rotor and a portion of each of said blades adjacent to the trailing end is rearwardly inclined relative to the direction of rotation.

6. A snow plow in accordance with claim 2 wherein each of said blades has a portion adjacent to its leading end which extends circumferentially of said cylinder with substantially less pitch than said angularity pitched portions.

7. A snow plow in accordance with claim 2 wherein each of said blades has a trailing end portion extending circumferentially of said cylinder with substantially less pitch than said angularly pitched portions.

8. A snow plow in accordance with claim 2 wherein each of said blades has a leading end portion extending circumferentially of said cylinder with substantially less pitch than said angularly pitched portions, and each of said blades has a trailing end portion extending circumferentially of said cylinder, with substantially less pitch than said angularly pitched portions.

9. A snow plow in accordance with claim 2 wherein said angular pitched portions of said blades extend circumferentially of the rotor approximately 120 degrees.

10. A snow plow in accordance with claim 2 wherein said angularly pitched portions of said blades extend circumferentially of the rotor approximately 120 degrees at an angle of approximately 45 degrees to planes perpendicular to the axis of the rotor.

*11. The combination of claim 1 wherein the pitch of the blades is so proportioned to their length that snow is moved by said blades to the intake opening of the blower in less than one complete revolution of the rotor.*

*12. The combination of claim 1 wherein the pitch of the blades is such as to accelerate the speed of movement of the snow as it approaches and passes through the intake opening of the blower whereby to avoid compression and compaction of the snow during its movement by the blades.*

*13. The combination of claim 1 wherein the pitch of the blades is so proportioned to their length that snow is moved by said blades to the intake opening of the blower in less than one complete revolution of the rotor, and the speed of movement of the snow is accelerated as the snow approaches and passes through the intake opening whereby to avoid compression and compaction of the snow during its movement by the blades.*

References Cited in the file of this patent or the original patent

UNITED STATES PATENTS

| | | |
|---|---|---|
| 175,716 | Lathrop et al. | Apr. 4, 1876 |
| 1,587,449 | Wandscheer | June 1, 1926 |
| 1,820,707 | Moen et al. | Aug. 25, 1931 |
| 1,837,087 | Wandscheer | Dec. 15, 1931 |
| 2,168,866 | Gehl | Aug. 8, 1939 |
| 2,198,237 | Voorderman | Apr. 23, 1940 |
| 2,387,423 | Venable | Oct. 23, 1945 |
| 2,387,959 | Wandscheer | Oct. 30, 1945 |
| 2,583,608 | Smith | Jan. 29, 1952 |
| 2,587,415 | Van Vick | Feb. 26, 1952 |
| 2,623,308 | Lamy | Dec. 30, 1952 |
| 2,731,739 | Miller | Jan. 24, 1956 |
| 2,735,199 | Wanner et al. | Feb. 21, 1956 |

FOREIGN PATENTS

| | | |
|---|---|---|
| 207,053 | Switzerland | Dec. 1, 1939 |
| 111,918 | Sweden | Sept. 26, 1944 |